US007908396B2

(12) United States Patent
Kalyanasundaram et al.

(10) Patent No.: US 7,908,396 B2
(45) Date of Patent: Mar. 15, 2011

(54) METHOD AND SYSTEM FOR SCHEDULING REQUESTS IN A NON-FIRST IN FIRST OUT (FIFO) ORDER IN A NETWORK

(75) Inventors: Suresh Kalyanasundaram, Indiranagar (IN); Rajeev Agrawal, Northbrook, IL (US); Jay P. Jayapalan, Buffalo Grove, IL (US); Ivan N. Vukovic, Arlington Heights, IL (US)

(73) Assignee: Motorola Mobility, Inc., Libertyville, IL (US)

( * ) Notice: Subject to any disclaimer, the term of this patent is extended or adjusted under 35 U.S.C. 154(b) by 865 days.

(21) Appl. No.: 11/289,970

(22) Filed: Nov. 30, 2005

(65) Prior Publication Data
US 2007/0124735 A1    May 31, 2007

(51) Int. Cl.
*G06F 15/173* (2006.01)
(52) U.S. Cl. .................................... 709/240; 709/238
(58) Field of Classification Search .............. 709/240, 709/238
See application file for complete search history.

(56) References Cited

U.S. PATENT DOCUMENTS

| 6,493,331 | B1 * | 12/2002 | Walton et al. ............. 370/341 |
| 6,985,462 | B2 * | 1/2006 | Hosein ..................... 370/329 |
| 2003/0108059 | A1 | 6/2003 | Yew et al. |
| 2004/0185868 | A1 | 9/2004 | Jain et al. |
| 2005/0043037 | A1 | 2/2005 | Loppe et al. |
| 2007/0041364 | A1 * | 2/2007 | Kakadia ................... 370/352 |

* cited by examiner

*Primary Examiner* — Kenny S Lin
*Assistant Examiner* — Shripal K Khajuria

(57) ABSTRACT

A method and a system for scheduling requests generated for a plurality of mobile devices in a communication network (100) has been disclosed. The requests are generated for a transmission opportunity. The method includes computing a sort metric (302) for each request, based on an information update. A lead-time is then computed (304) with respect to a drop-dead time for each request, based on the sort metric for a time slice. The drop-dead time for a given time slice is the time before which scheduling has to be done so that data can be transmitted during the given time slice. Each request may be considered (306) for allocation in the time slice before the beginning of a next time slice, based on the lead-time.

24 Claims, 5 Drawing Sheets

METHOD AND SYSTEM FOR SCHEDULING REQUESTS IN A NON-FIRST IN FIRST OUT (FIFO) ORDER IN A NETWORK

FIELD OF THE INVENTION

The present invention relates generally to the field of communication networks. More specifically, the present invention relates to serving requests generated by a plurality of mobile devices in a communication network.

BACKGROUND

A communication network includes a plurality of mobile devices, a plurality of Base Transceiver Stations (BTSs), and at least one Base Station Controller (BSC). Examples of mobile devices include cell phones, Personal Digital Assistants (PDAs), etc. In the downlink, the BSC generates requests for resources to transmit data to the mobile, and, in the uplink, the mobile devices generate the requests for resources to transmit data. The requests are sent to the BTSs, which may schedule the requests.

The request may be scheduled using a variety of methods including the weighted fair queuing method, the earliest-due-date method, the priority-queuing method and the shortest fair queuing method. In the shortest fair queuing method, each request is stamped with a start tag based on a predetermined criteria. The requests are then served in an increasing order of the start tags associated with each request.

The BTSs may schedule the requests from the mobile devices in a First In First Out (FIFO) order. A request received first by the BTS may be given a higher priority for allocation of the resource than a request received later.

Alternately, the BTSs may schedule the requests in a non-FIFO order, such as based on a priority of the request. The priority of the request is determined by using one or more predetermined criteria. The BTSs receive the requests at different times and have to wait for a predetermined period so as to receive all requests for a time slice before scheduling these requests for the time slice. Thereafter, sorting is performed and the requests are scheduled and served in the next time slice.

One or more of the methods described above may suffer from one or more of the following limitations. Firstly, they do not operate in a distributed soft handoff environment. Secondly, the requests served in the FIFO order do not take into account the priorities associated with the requests. Thirdly, for serving requests in the non-FIFO order the BTSs have to wait till a predetermined period of time to receive each request. Moreover, in a Soft Hand Off (SHO) environment, resources that have been allocated cannot be reallocated if they are greater than the final allocation for a mobile device. Lastly, the requests served in a non-FIFO order require high processing on the communication network.

BRIEF DESCRIPTION OF THE FIGURES

The accompanying figures, where like reference numerals refer to identical or functionally similar elements throughout the separate views and which together with the detailed description below are incorporated in and form part of the specification, serve to further illustrate various embodiments and to explain various principles and advantages all in accordance with the present invention.

Figure 1:
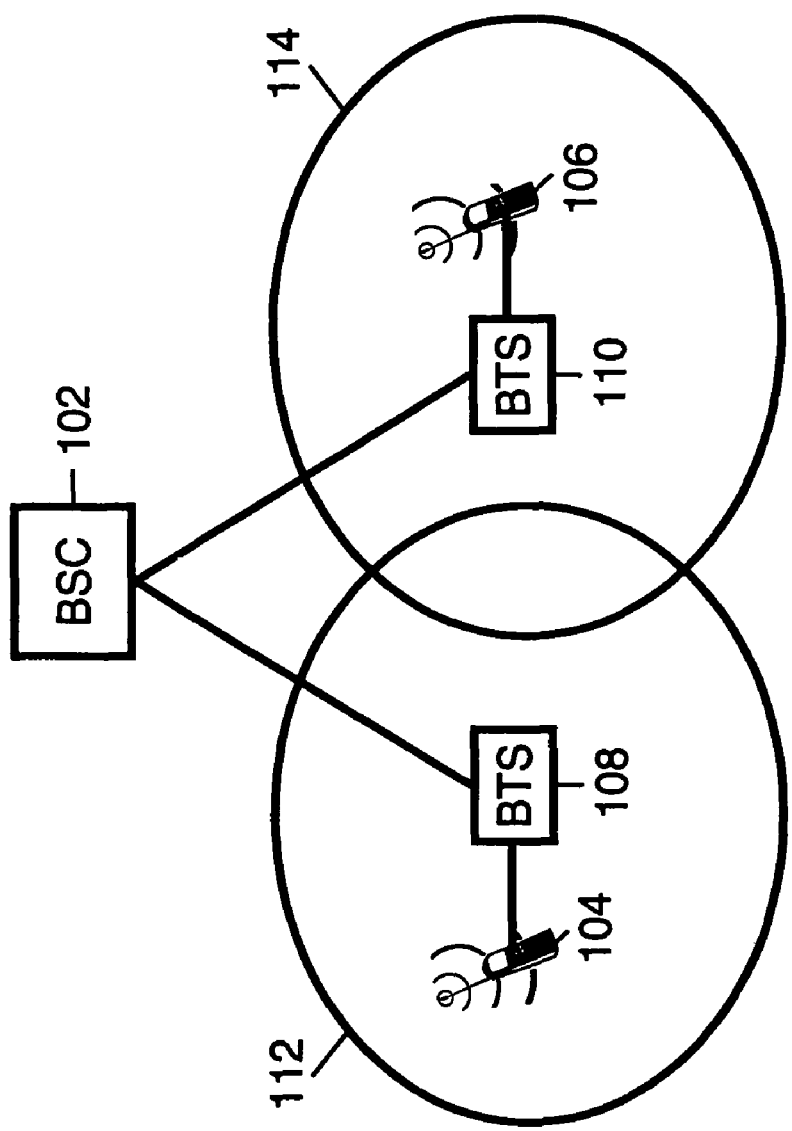
FIG. 1 is a block diagram illustrating a communication network, in accordance with an exemplary embodiment of the present invention.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present invention.

DETAILED DESCRIPTION

Before describing in detail embodiments that are in accordance with the present invention, it should be observed that the embodiments reside primarily in combinations of method steps and apparatus components related to scheduling requests in a non First In First Out (FIFO) order in a communication network. Accordingly, the apparatus components and method steps have been represented where appropriate by conventional symbols in the drawings, showing only those specific details that are pertinent to understanding the embodiments of the present invention so as not to obscure the disclosure with details that will be readily apparent to those of ordinary skill in the art having the benefit of the description herein.

The terms "comprises," "comprising," or any other variation thereof, are intended to cover a non-exclusive inclusion, such that a process, method, article, or apparatus that comprises a list of elements does not include only those elements but may include other elements not expressly listed or inherent to such process, method, article, or apparatus. An element proceeded by "comprises . . . a" does not, without more constraints, preclude the existence of additional identical elements in the process, method, article, or apparatus that comprises the element.

It will be appreciated that embodiments of the invention described herein may be comprised of one or more conventional processors and unique stored program instructions that control the one or more processors to implement, in conjunction with certain non-processor circuits, some, most, or all of the functions of scheduling requests in a non first in first out order in a communication network described herein. The non-processor circuits may include, but are not limited to, a radio receiver, a radio transmitter, signal drivers, clock circuits, power source circuits, and user input devices. As such, these functions may be interpreted as steps of a method to perform scheduling requests in a non-first in first out order in a network. Alternatively, some or all functions could be implemented by a state machine that has no stored program instructions, or in one or more application specific integrated circuits (ASICs), in which each function or some combinations of certain of the functions are implemented as custom logic. Of course, a combination of the two approaches could be used. Thus, methods and means for these functions have been described herein. Further, it is expected that one of ordinary skill, notwithstanding possibly significant effort and many design choices motivated by, for example, available time, current technology, and economic considerations, when guided by the concepts and principles disclosed herein will be readily capable of generating such software instructions and programs and ICs with minimal experimentation.

A method and system for scheduling requests generated for a plurality of mobile devices in a communication network is disclosed. The requests are generated by a Base Station Controller (BSC) for downlink transmission and by the plurality of mobile devices for uplink transmission. These requests are generated for a transmission opportunity at a determined data rate for the plurality of mobile devices. The method involves computing a sort metric for each request based on an information update. The sort metric associated with a request represents a priority associated with the request. The sort metric is used by a plurality of Base Transceiver Stations (BTSs) to compute a lead-time for each request in a time slice. Based on the lead-time, each request is considered for allocation in the time slice before the beginning of the next time slice.

FIG. 1 is a block diagram illustrating a communication network 100, in accordance with an exemplary embodiment of the present invention. The communication network 100 includes a Base Station Controller (BSC) 102, a mobile device 104, a mobile device 106, a Base Transceiver Stations (BTS) 108 and a BTS 110. As understood by those skilled in the art, the network 100 may include multiple BTSs, BSCs, and a plurality of mobile devices. Examples of the mobile devices 104 and 106 include cell phones, Personal Digital Assistants (PDAs), and the like. The mobile devices 104 and 106 are capable of communicating with the BTSs 108 and 110, which then communicates with the BSC 102. During a Down Link (DL) transmission of data, which is the transmission of data from the BSC to a mobile device, the BSC 102 monitors the current buffer occupancy of the data buffered at the BSC 102, where the data is meant for the mobile devices 104 and 106, and determines whether a request for additional network resources has to be generated or not. The mobile devices 104 and 106 may need the additional network resources for a transmission opportunity. A mobile device requires the transmission opportunity to transmit data to or receive data from other mobile devices or electronic devices in the communication network 100 at a predetermined data rate. The predetermined data rate may be measured in megabits per second (mbps) or kilobits per second (kbps).

A BSC monitors the buffer occupancy for downlink data, and mobile devices monitor buffer occupancy for an Up Link (UL) transmission, which is the transmission of data from the mobile devices 104 and 106 to the BSC 102. For the UL transmission of data, one or more of the mobile devices 104 and 106 may generate a request for the additional network resources. The BSC 102 also performs one or more of a radio channel allocation, a frequency administration, and a handover for the BTSs 108 and 110. Handover between BTSs within the communication network 100 occurs when a mobile device moves within the communication network 100 so that the BTS, which is providing services to the mobile device, no longer can provide such services.

Each of the BTSs 108 and 110 has an associated coverage area in which it can transmit signals to or receive signals from the mobile devices. For example, the BTS 108 can transmit to or receive signals from the mobile device 104, which lies in a coverage area 112. Similarly, the BTS 110 can transmit to or receive signals from the mobile device 106, which lies in a coverage area 114.

Each mobile device may undergo a Soft Handoff (SHO) when it moves from one coverage area to another. For example, when the mobile device 104 moves from the coverage area 112 to the coverage area 114, it may undergo an SHO. Each mobile device undergoing an SHO has one or more active SHO leg associated with it. Each active SHO leg represents each of the BTSs 108 and 110 in the coverage area of the communication network 100 to which the mobile devices 104 and 106 may transmit and receive signals.

Figure 2:
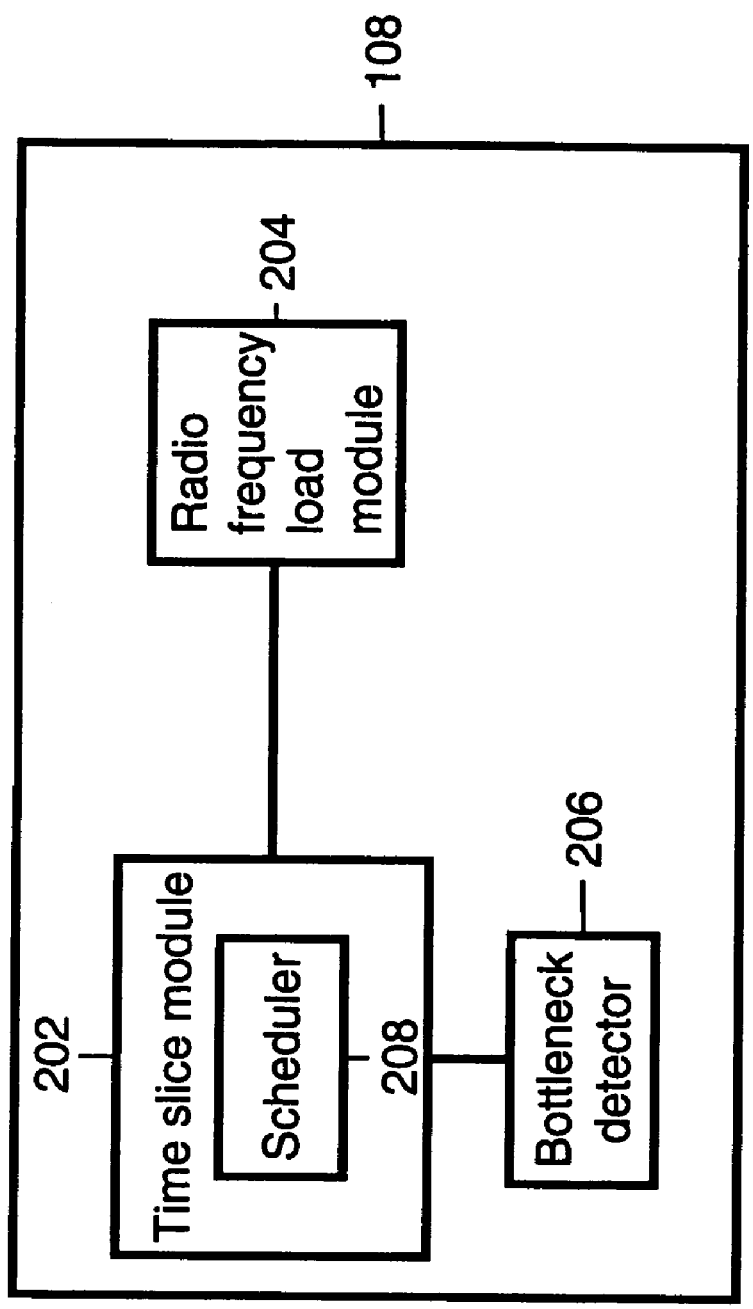
FIG. 2 is a block diagram illustrating the components of a Base Transceiver Station (BTS), in accordance with an embodiment of the present invention.

FIG. 2 is a block diagram illustrating the components of the BTS 108, in accordance with an embodiment of the present invention. It should be appreciated that though the components are shown for the BTS 108, the same is applicable for other BTSs present in the communication network 100. The BTS 108 includes a time slice module 202, a radio frequency load module 204, and a bottleneck detector 206. The time slice module 202 receives requests for a channel, including during SHO, from the BSC 102. The time slice module 102 may also receive current buffer occupancy of a mobile device's buffer at the BSC 102. The request for channel from the BSC 102 to the BTS 108 can be converted into an information update. The information update may include, but is not limited to, the radio conditions of the channels of the plurality of mobile devices, the quality of service requested by the plurality of mobile devices, and an existing data rate received by the plurality of mobile devices. In an embodiment of the invention, the BSC 102 sends multiple information updates to the BTS 108.

The time slice module 202 computes a lead-time for each request, based on a sort metric. The sort metric is a metric that lets one compare the priority to schedule one mobile device's transmission over that of another. The sort metric represents the assigned priorities associated with the requests for allocation made by the plurality of mobile devices and tells the network how early it can make a decision on scheduling. The sort metric helps the time slice module 202 to schedule a request for transmission. In an embodiment of the present invention, the time slice module 202 includes information required to compute the sort metric. The information includes, but not limited to, a past history of scheduling decision and radio condition of the channel to/from the mobile device. The sort metric for each request is computed by the BSC 102 based on the information update.

The radio conditions of the channels of the plurality of mobile devices included in the information update are sent to the BSC 102 by the radio frequency load module 204. The BSC 102 then forwards the sort metric to the BTS 108, so as to enable the BTS 108 to compute a lead-time using the information in the sort metric.

In another embodiment of the present invention, the sort metric is computed by the time slice module 202, which computes the sort metric based on the information update. Here, the information such as the quality of service requested by the plurality of mobile devices requesting resources and an existing data rate received by the plurality of mobile devices is sent by the BSC 102 or the plurality of mobile devices to the time slice module 202. The radio frequency load module 204 may also send periodic updates on the radio conditions of the channels of the plurality of mobile devices to the time slice module 202.

The time slice module 202 computes the lead-time from the sort metric based on a bottleneck resource. The bottleneck resource is detected by the bottleneck detector 206. Examples of the bottleneck resource include, but are not limited to, a BTS processing resource, a BSC processing resource, a Down Link (DL) backhaul, and an Up Link (UL) backhaul. For example, if the bottleneck resource is a BTS processing power, then the lead-time will be such that a request becomes eligible after every "delta" units of time. Delta in the above case may be defined by the following equation:

delta=T/N;

where,
T=time slice duration; and
N=number of requests.

If the BTS processing power is not enough to process a request within a drop-dead time for a given time slice, then a slack time is provided, after which the BTS starts processing requests. During the slack time a request is not eligible for processing. After the slack time, the requests become eligible for processing after every "delta" units of time. Delta in the above case may be defined by the following equation:

Delta=(T-S)/N where,
T=time slice duration;
S=slack time duration; and
N=number of requests.

A scheduler 208, which can be included in the time slice module 202, considers the requests received from the BSC 102 for downlink transmission, and from the plurality of mobile devices, for example, mobile devices 104 and 106 for uplink traffic for channel resource allocation. The requests are considered for resource allocation based on the lead-time computed by the time slice module 202. In an embodiment of the invention, if a request received for the mobile device 104 has a higher lead-time than a request received for the mobile device 106, then the scheduler 208 considers the request received for the mobile device 104 for resource allocation ahead of the request received for the mobile device 106 in the time slice. The method for scheduling the request is explained in detail in conjunction with FIG. 3.

Figure 3:
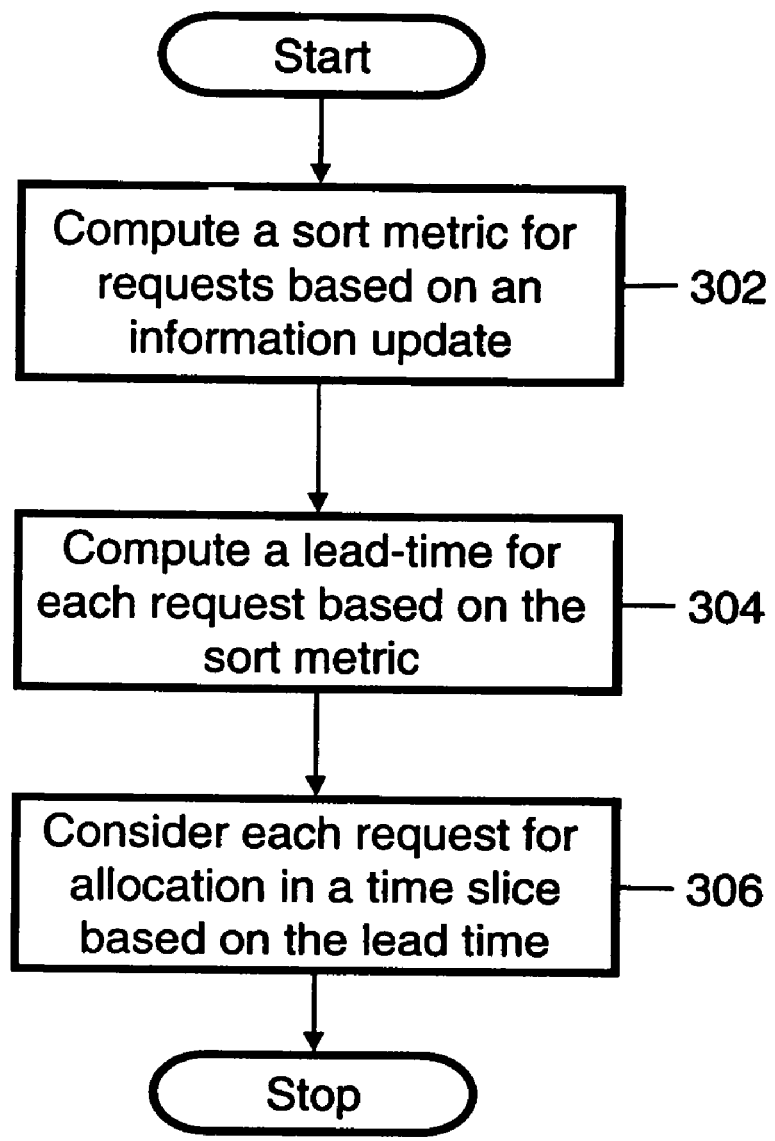
FIG. 3 is a flowchart illustrating a method for scheduling requests, in accordance with an embodiment of the present invention.

FIG. 3 is a flowchart illustrating a method for scheduling requests, in accordance with an embodiment of the present invention. At step 302, a sort metric is computed for requests generated for the plurality of mobile devices in the communication network 100. The requests may be generated either by the plurality of mobile devices for uplink transmission and by the BSC 102 for downlink transmission. The sort metric, which may represent a priority associated with the request for resource allocation, is computed based on an information update. The information update may include one or more of radio conditions of the channels of the plurality of mobile devices, a quality of service requested by the plurality of mobile devices, or an existing data rate received by the plurality of mobile devices.

In accordance with an embodiment of the present invention, the BSC 102 computes the sort metric for each request and forwards the sort metric to the plurality of BTSs. If a mobile device from the plurality of mobile devices is in an SHO, then the BSC 102 forwards the sort metric for the requests to each BTS with which the mobile device has an active SHO leg. In another embodiment of the present invention, the BSC 102 forwards the information update to the plurality of BTSs so as to enable the plurality of BTSs to compute the sort metric for each request. If a mobile device from the plurality of mobile device is in an SHO, then the BSC 102 forwards the information update to each BTS with which the mobile device has an active SHO leg.

The radio condition of the channels being used by the plurality of mobile devices is the quality of a communication channel between the plurality of mobile devices and the plurality of BTSs. The quality of the channel determines the amount of resource that would be required by the plurality of BTSs to transmit data to the plurality of the mobile devices. The quality of channel depends on a number of factors, which may include, but are not limited to, the distance of a mobile device from a BTS and the location of the mobile device. For example, if the mobile device is behind a building or in the basement of a building, it may not have a good channel. A mobile device with a good radio condition as compared to the remaining mobile devices in the communication network 100, including the mobile device behind the building, may have a higher priority to receive the transmission opportunity.

In an embodiment of the present invention, the quality of service requested by the plurality of mobile devices has a bearing on the magnitude of the data rate demanded by each mobile device. For example, users of each mobile device may be categorized as a first priority user and a second priority user based on the data rate required by them. The first priority users require a higher data rate than the second priority users. Therefore, the first priority users may have a higher priority than the second priority users. This priority information is considered while computing the sort metric. In various embodiments of the present invention, the sort metric maybe computed based on one or more of the radio condition of the channels being used by the plurality of mobile devices, the quality of service requested by the plurality of mobile devices, and an existing data rate received by the plurality of the mobile devices.

In another embodiment of the present invention, a sort metric depicts a priority associated with the request. A request with a small sort metric has a large lead-time and hence a higher priority as compared to a request with a large sort metric, to ensure that the request with a high priority is scheduled well before the drop-dead time associated with the time slice. The requests that could not be considered for allocation within the drop-dead time are served in another time slice.

At step 304, a lead-time is computed for each request. The lead-time is based on the sort metric associated with it. The lead-time for each mobile device is calculated by the BTSs within a time slice and with respect to a drop-dead time. The drop-dead time for a given time slice is the time before which the scheduler 208 has to complete the scheduling so that data can be transmitted during the given time slice. If a mobile device is in an SHO, then each BTS with which the mobile device has an active SHO leg, computes the lead-time for the request.

The method used for computing the lead-time is based on a bottleneck resource, which is determined by the bottleneck detector 206. Examples of the bottleneck resource include, but are not limited to, a BSC processing resource, a DL backhaul, and a UL backhaul. If the bottleneck resource is a BTS processing resource, the BTS 108 determines the number of active users in a previous time slice. The time slice is then divided into equal intervals by the time slice module 202 wherein each interval depends on the number of active users.

For example, if the BTS 108 determines that there were three active users in the previous time slice, then the time slice module 202 divides the time slice into three equal intervals. Thereafter, requests generated for the plurality of mobile devices are scheduled, so that a request with a least sort metric is scheduled at the end of the first interval of the three intervals, and a request with the second-lowest sort metric is scheduled at the end of the second interval, and so on. Therefore, the lead-time for the request with the least sort metric is higher than the lead-time for the request with the second-lowest sort metric.

At step 306, each request is considered for allocation in the time slice based on the lead-time. The requests are considered for allocation before the drop-dead time in the time slice. Otherwise, the requests cannot be processed and will need to be processed for another time slice. In an embodiment of the invention, a request is considered for allocation at a time equal to the difference between the drop-dead time and the lead-time of the request or later. If a mobile device is in an SHO, the request for the mobile device is considered for allocation by each BTS with which the mobile device has an active SHO leg. In various embodiments of the invention, the requests are considered for allocation by the scheduler 208.

After scheduling the request, the transmission opportunity at the determined data rate is allocated to the plurality of mobile devices by a BTS from the plurality of BTSs in coverage area of which the mobile devices lie. In an embodiment of the invention, a request with a larger lead-time in the time slice is allocated a transmission opportunity ahead of a request with a smaller lead-time. In another embodiment of the invention, a request with a small lead-time in the time slice may be allocated a transmission opportunity in the subsequent time slices if the amount of resource required by the request is not available in the time slice. The method for allocating the transmission opportunity is explained in detail in conjunction with FIGS. 4 and 5.

Figure 4:
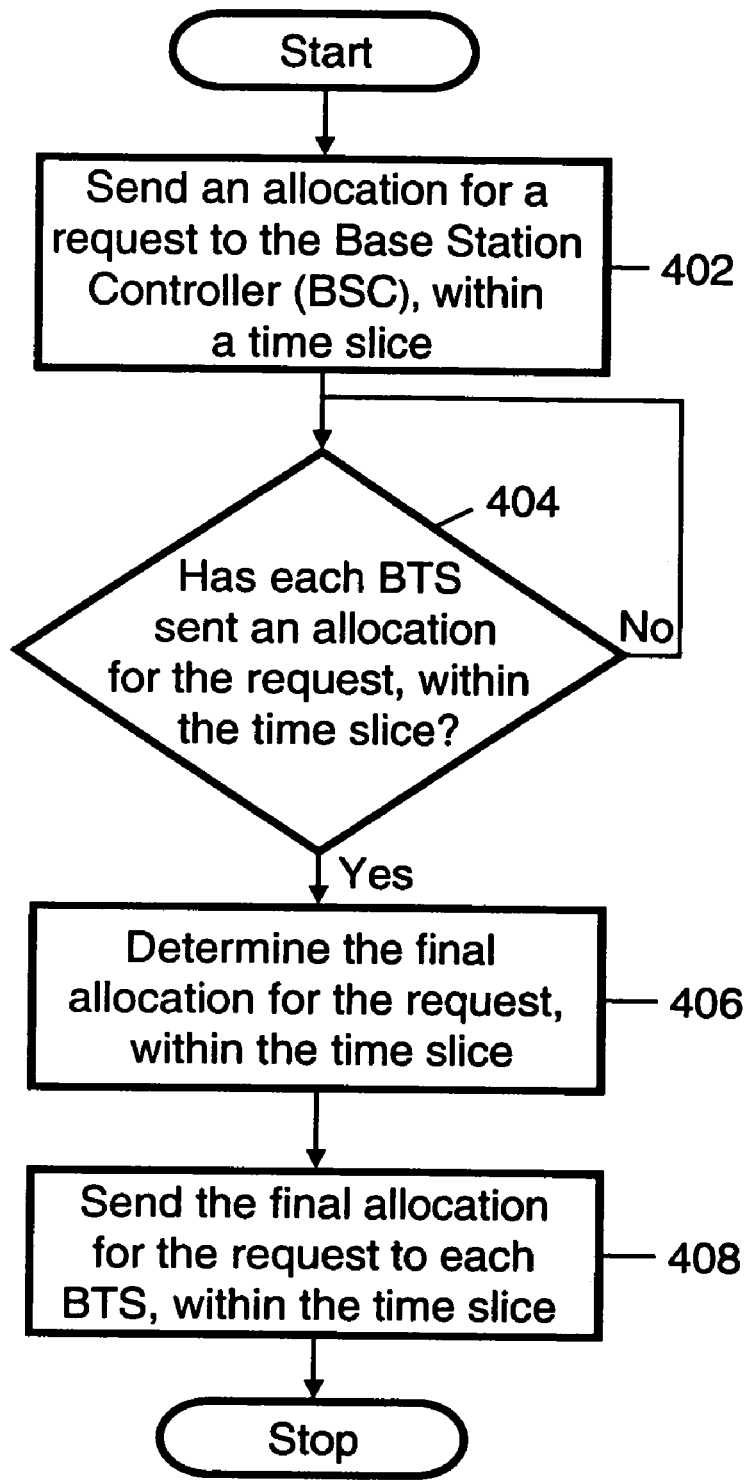
FIG. 4 is a flowchart illustrating a method for determining the final allocation for a request in an SHO environment, in accordance with an embodiment of the present invention.

FIG. 4 is a flowchart illustrating a method for determining the final allocation for a request in an SHO environment, in accordance with an embodiment of the present invention. The request is generated for a mobile device in an SHO environment in the communication network 100. At step 402, a transmission opportunity allocated to the request at a determined data rate is sent to the BSC 102 within the time slice. The request is initially allocated using the method described in conjunction with FIG. 3. In various embodiments of the present invention, step 402 is performed by each BTS with which a mobile device has an active SHO leg. For example, if the BTSs 108 and 110 are the active SHO legs for the mobile device 104, then the BTSs 108 and 110 will send the allocation for the request generated for the mobile device 104 to the BSC 102.

At step 404, a check is performed to determine if each BTS with which the mobile device has an active SHO leg has sent an allocation for the request. In various embodiments of the present invention, step 404 is performed by the BSC 102. For example, if the BTSs 108 and 110 act as active SHO legs for the mobile device 104, then the BSC 102 will check if they have sent an allocation for a request generated for the mobile device 104 within a time slice. If each BTS with which the mobile device has an active SHO leg has not sent an allocation for the request within the time slice, then step 404 is repeated.

If each BTS with which the mobile device has an active SHO leg has sent an allocation for the request within a time slice, step 406 is performed. At step 406, a final allocation for the request is determined. The final allocation for the request is the minimum of all allocations received for the request. For example, if an allocation made by the BTS 108 for a request generated for the mobile device 104 is less than an allocation made by the BTS 110, then the final allocation will be the allocation made by the BTS 108. In various embodiments of the present invention, step 406 is performed by the BSC 102.

Thereafter, at step 408, the final allocation for the request is sent to each BTS with which the mobile device has an active SHO leg, within the time slice. This enables each BTS that had made an allocation that was larger than the final allocation to reallocate the additional resources that have now become free to a request made by another mobile device from the plurality of mobile devices. For example, for a request generated for the mobile device 104, resources have been allocated by the BTSs 108 and 110 with which the mobile device 104 has an active SHO leg. The allocation made by the BTS 108 is less, as compared to the allocation made by the BTS 110. In this case, the allocation made by the BTS 108 is assigned to the mobile device 104. Hence, the additional resource needed for the higher allocation made at the BTS 110 becomes free. This additional resource is used to make an allocation to a request generated for another mobile device, for example, the mobile device 106. In various embodiments of the invention, step 408 is performed by the BSC 102.

Figure 5:
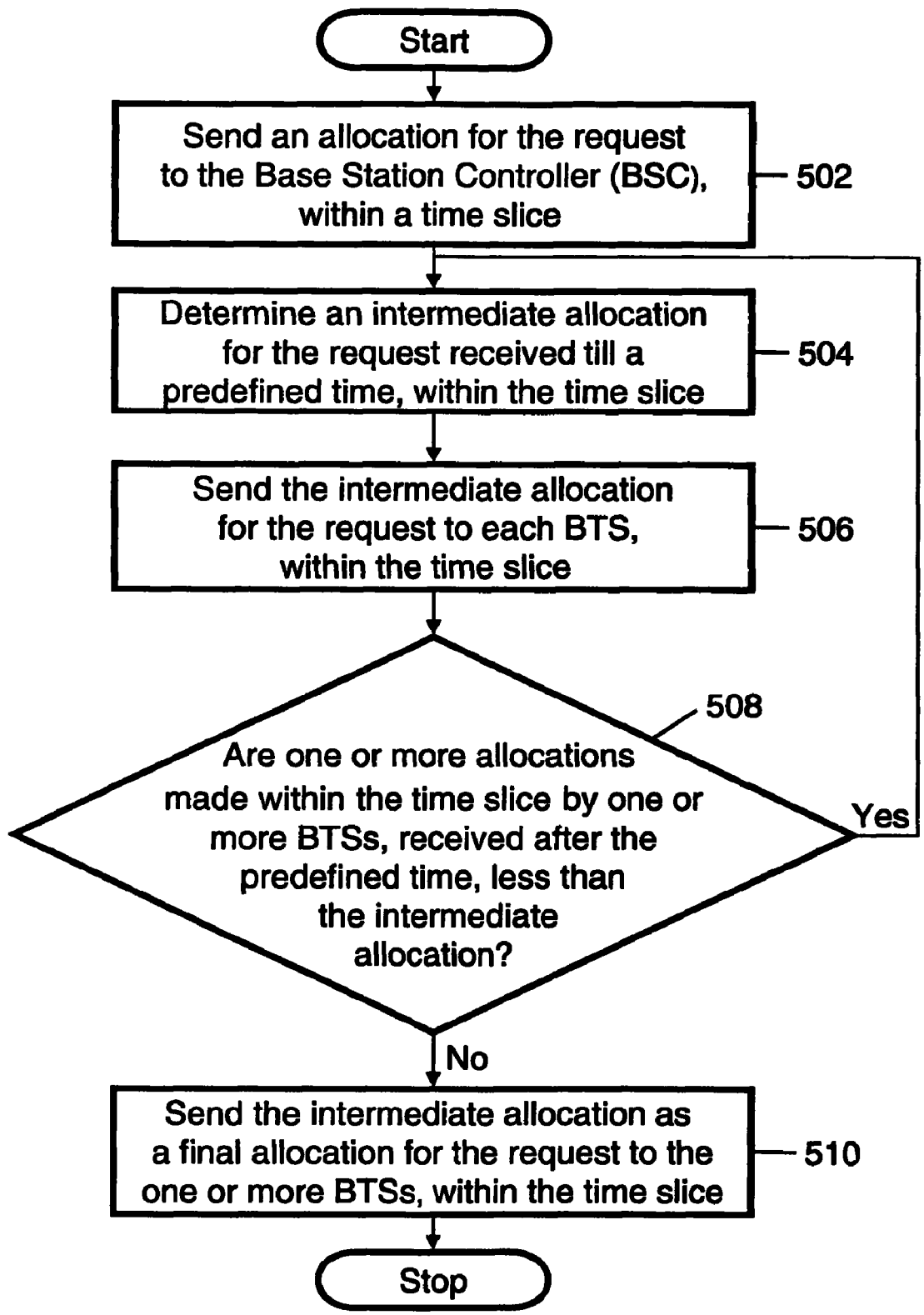
FIG. 5 is a flowchart illustrating a method for allocating the transmission opportunity to a request, in accordance with another embodiment of the present invention.

FIG. 5 is a flowchart illustrating a method for allocating the transmission opportunity to a request in accordance with another embodiment of the present invention. The request is generated for a mobile device in an SHO environment in the communication network 100. At step 502, a transmission opportunity allocated to the request at a determined data rate is sent to the BSC 102 from the BTSs having an active SHO leg for a mobile device. Step 502 is performed by each BTS with which a mobile device, for which the request has been generated, has an active SHO leg for a mobile device.

At step 504, an intermediate allocation for the request is determined from the allocations received before a predefined time within the time slice. The predefined time is a fraction of the time slice. The intermediate allocation for the request is the minimum of each allocation received for the request till the predefined time within the time slice. In various embodiments of the present invention, step 504 is performed by the BSC 102.

At step 506, the intermediate allocation for the request is sent to each BTS with which the mobile device has an active SHO leg within the time slice. At step 508, a check is performed to determine if one or more allocations made within the time slice by the BTSs with which the mobile device has an active SHO leg are received after the predefined time and are less than the intermediate allocation. In various embodiments of the present invention, step 508 is performed by the BSC 102.

If the allocation made by the BTS for a request generated for the mobile device is received by BSC, and is larger than the intermediate allocation, then step 510 is performed. At step 510, the BSC sends the intermediate allocation as the final allocation to the BTS. Step 510 is performed by the BSC 102. For example, if an allocation made by the BTS 108 for a request generated for the mobile device 104 is received by the BSC 102 after the predefined time and the allocation is larger than the intermediate allocation, then the BSC 102 sends the intermediate allocation as a final allocation to the BTS 108.

If one or more allocations made within the time slice by the BTSs with which the mobile device has an active SHO leg are received after the predefined time and are less than the intermediate allocation, then step 504 is performed. For example, if an allocation made by the BTS 108 for a request generated for the mobile device 104 is received by the BSC 102 after the selected time, and the allocation is less than the intermediate allocation, then the allocation made by the BTS 108 becomes the intermediate allocation, and is thereafter sent to both the BTSs. This enables BTS 108 to free an allocated transmission opportunity as soon as the BSC 102 determines that the allocation made by the BTS 108 is larger than the intermediate allocation for the request.

In an embodiment of the invention, a combination of methods, explained in FIGS. 4 and 5, can be used for allocating the transmission opportunity.

In another embodiment of the present invention, a speculative scheduling of the requests may be performed in each BTS by the scheduler 208. The speculative scheduling is achieved by initially making a conservative allocation to a request and sending the conservative allocation to the BSC 102. The conservative allocation is then updated by each BTS, based on the remaining resources and new allocations.

Various embodiments of the present invention, as described above, provide a method and a system for scheduling requests generated for a plurality of mobile devices in a non-FIFO order. The requests for the plurality of mobile devices are considered for allocation, based on a lead-time computed by the BSC 102 or by the BTSs 108 and 110, and where processing of requests by the BTSs 108 and 110 is distributed across time instead of waiting for all requests to arrive and processing them all at once, and therefore reduces the processing power required for scheduling the requests in a non-FIFO order.

In the foregoing specification, specific embodiments of the present invention have been described. However, one of ordinary skill in the art appreciates that various modifications and changes can be made without departing from the scope of the present invention as set forth in the claims below. Accordingly, the specification and figures are to be regarded in an illustrative rather than a restrictive sense, and all such modifications are intended to be included within the scope of present invention. The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

We claim:

1. A method for scheduling requests generated for a plurality of mobile devices in a communication network, the requests being generated for a transmission opportunity, the method comprising: computing a sort metric for each request based on an information update, wherein the sort metric represents a priority associated with each request; computing a lead-time for each request based on the sort metric for a time slice wherein the lead-time is a time when each request is considered for allocation in the time slice before the beginning of a next time slice, the lead-time being computed with respect to a drop-dead time of the time slice, wherein the drop-dead time is a time before which scheduling has to be completed so that data can be transmitted during the time slice and wherein each request becomes eligible for processing after a unit of time determined by (T-S)/N where T is a duration of the time slice, S is the duration of a slack time during which a request is not eligible for processing and N is a number of requests; and considering each request for allocation in the time slice before the beginning of a next time slice such that the request is considered for allocation within a time interval equal to a difference between the drop-dead time and the lead-time for the request.

2. The method according to claim 1, wherein each request is considered for allocation before the drop-dead time of the time slice.

3. The method according to claim 1 further comprising: forwarding each request to a plurality of Base Transceiver Stations (BTSs) in the communication network, wherein the request is forwarded by at least one Base Station Controller (BSC) in the communication network; and sending the information update to the plurality of BTSs.

4. The method according to claim 3, wherein the information update is sent by one of: the BSC and the plurality of mobile devices.

5. The method according to claim 1, wherein considering each requests comprises allocating the transmission opportunity and, optionally, a data rate to the plurality of mobile devices, the allocation being done by the plurality of BTSs.

6. The method according to claim 5, wherein each request with a larger lead-time in the time slice is allocated the transmission opportunity ahead of each request with a lower lead-time in the time slice.

7. The method according to claim 5, wherein allocating the transmission opportunity comprises: sending the allocations to the BSC, the allocations being sent by each BTS; determining a final allocation for each mobile device, wherein the BSC determines the final allocation, the final allocation being least of each allocation sent by each BTS for each mobile device; and sending the final allocation to each BTS.

8. The method according to claim 1, wherein computing the lead-time comprises: determining a bottleneck resource; and computing the lead-time based on the bottleneck resource.

9. The method according to claim 1, wherein the information update for computing the sort metric comprises: the radio condition of channels of the plurality of mobile devices; the quality of service requested by the plurality of mobile devices; and an existing data rate received by the plurality of mobile devices.

10. The method according to claim 9, wherein the radio condition of channels comprises radio condition of channels in one or more Soft Handoff (SHO) legs of the plurality of mobile devices.

11. A method for scheduling requests generated for a plurality of mobile devices in a communication network, the request being generated for a transmission opportunity, the method comprising: forwarding each request to a plurality of Base Transceiver Stations (BTSs) in the communication network; sending an information update to the plurality of BTSs; computing a sort metric for each request based on the information update, wherein the sort metric represents a priority associated with each request; computing a lead-time for each request based on the sort metric for a time slice wherein the lead-time is a time when each request is considered for allocation in the time slice before the beginning of a next time slice, the lead-time being computed with respect to a drop-dead time of the time slice, wherein the drop-dead time is a time before which scheduling has to be completed so that data can be transmitted during the time slice and wherein each request becomes eligible for processing after a unit of time determined b¥(T-S)/N where T is a duration of the time slice, S is the duration of a slack time during which a request is not eligible for processing and N is a number of requests; and considering each request for allocation in the time slice before the beginning of a next time slice such that the request is considered for allocation within a time interval equal to a difference between the drop-dead time and the lead-time for the request.

12. The method according to claim 11, wherein the information update is sent by one of: the BSC and the plurality of mobile devices.

13. The method according to claim 11, wherein each request is considered for allocation before the drop-dead time of the time slice.

14. The method according to claim 11, wherein considering each request comprises allocating the transmission opportunity and optionally, a data rate to the plurality of mobile devices, the allocation being done by the plurality of BTSs.

15. The method according to claim 14, wherein each request with a larger lead-time in the time slice is allocated the transmission opportunity ahead of each request with a lower lead-time in the time slice.

16. The method according to claim 14, wherein allocating the transmission opportunity comprises: sending the allocations to the BSC, the allocations being sent by each BTS;

determining a final allocation for each mobile device, wherein the BSC determines the final allocation, the final allocation being least of each allocation sent by each BTS for each mobile device; and sending the final allocation to each BTS.

17. The method according to claim 11, wherein computing the lead-time comprises: determining a bottleneck resource; and computing the lead-time based on the bottleneck resource.

18. The method according to claim 11, wherein the information update comprises: the radio condition of channels of the plurality of mobile devices; the quality of service requested by the plurality of mobile devices; and an existing data rate received by the plurality of mobile devices.

19. The method according to claim 18, wherein the radio condition comprises radio condition of one or more Soft Handoff (SHO) legs of the plurality of mobile devices.

20. A system for scheduling requests generated for a plurality of mobile devices in a communication network, the system comprising: a plurality of Base Transceiver Stations (BTSs) that are capable of receiving requests, the requests being generated for a transmission opportunity wherein the BTS comprise a time slice module that is capable of computing a lead-time for each request based on a sort metric and a scheduler capable of scheduling the requests based on the lead-time such that each request with a larger lead-time in a time slice is considered for allocation of a transmission opportunity ahead of each request with a lower lead-time in the time slice and within a time interval equal to a difference between a drop-dead time of the time slice and the lead-time of the requests such that the request is allocated before the drop-dead time and wherein the lead-time is a time when each request is considered for allocation in the time slice before the beginning of a next time slice and the drop-dead time is a time before which scheduling has to be completed so that data can be transmitted during the time slice, wherein a slack time is provided before processing the requests when at least one of the plurality of BTSs lacks required processing power, the plurality of BTSs further being capable of receiving an information update from the plurality of mobile devices and wherein each request becomes eligible for processing after a unit of time determined by (T-S)/N where T is a duration of the time slice, S is the duration of a slack time during which a request is not eligible for processing and N is a number of requests; and a Base Station Controller (BSC) the BSC being capable of computing the sort metric based on the information update, wherein the sort metric represents a priority associated with each request, the information update being sent by the plurality of BTSs.

21. The system according to claim 20, wherein the information update for computing the sort metric comprises: the radio condition of channels of the plurality of mobile devices; the quality of service requested by the plurality of mobile devices; and an existing data rate received by the plurality of mobile devices.

22. The system according to claim 20, wherein each of the plurality of BTSs comprises a bottleneck detector, the bottleneck detector determining a bottleneck resource, the bottleneck resource being used in computing the lead-time.

23. The system according to claim 20, wherein the time slice module is further capable of computing the sort metric for each request based on the information update.

24. The system according to claim 20, wherein each of the plurality of BTSs comprises a radio frequency load module that is capable of sending periodic updates to the BSC, the periodic updates being information about channel conditions of the each of the plurality of mobile devices.

* * * * *